(12) United States Patent
Yamamoto et al.

(10) Patent No.: US 6,736,131 B2
(45) Date of Patent: May 18, 2004

(54) GAS FRYER WITH IMPROVED HEAT-EXCHANGE PROPERTIES

(75) Inventors: Osamu Yamamoto, 4-1, Aza Daimon, Inuyama, Aichi (JP); Yoshihiro Terabe, Aichi (JP)

(73) Assignees: K.K. Fuji Enterprize, Aichi (JP); Osamu Yamamoto, Aichi (JP)

( * ) Notice: Subject to any disclaimer, the term of this patent is extended or adjusted under 35 U.S.C. 154(b) by 7 days.

(21) Appl. No.: 10/156,657

(22) Filed: May 29, 2002

(65) Prior Publication Data

US 2003/0034027 A1 Feb. 20, 2003

(30) Foreign Application Priority Data

Jun. 6, 2001 (JP) .......................... 2001-171652
Oct. 25, 2001 (JP) .......................... 2001-327663

(51) Int. Cl.⁷ .......................... A47J 27/026; A47J 27/02
(52) U.S. Cl. .................. 126/391.1; 126/376.1
(58) Field of Search .................. 126/391.1, 376.1, 126/390.1; 138/38; 165/109.1; 122/18.31

(56) References Cited

U.S. PATENT DOCUMENTS

| | | | | |
|---|---|---|---|---|
| 2,292,156 A | * | 8/1942 | Pitman | 126/374.1 |
| 3,970,072 A | * | 7/1976 | Chipchase | 126/391.1 |
| 5,632,197 A | * | 5/1997 | Lubawy et al. | 99/403 |
| 5,778,871 A | * | 7/1998 | Herring | 126/391.1 |
| 6,192,880 B1 | * | 2/2001 | Furuhashi | 126/391.1 |

* cited by examiner

Primary Examiner—Alfred Basichas
(74) Attorney, Agent, or Firm—Armstrong, Kratz, Quintos, Hanson & Brooks, LLP (57) ABSTRACT

A gas fryer includes a tank for holding cooking oil, a heat pipe located in the middle depth of the tank so that the heat pipe is soaked in the cooking oil, a combustion chamber located at the combustion gas inlet side of the heat pipe, and a flue located at a combustion gas outlet side of the heat pipe. The heat pipe has a sleeve fitted in the inner wall of the heat pipe, and a spirally shaped mixer installed in the heat pipe. The flue also has an introduction system for fresh air, with a blowing nozzle of the fresh air positioned proximate to a narrowed region located about in the middle of the flue along a longitudinal axis, an inlet of fresh air located at a part of the flue, and a passage of fresh air provided along the inner and/or outer wall of the flue.

14 Claims, 7 Drawing Sheets

PRIOR ART

FIG.7  PRIOR ART

GAS FRYER WITH IMPROVED HEAT-EXCHANGE PROPERTIES

FIELD OF THE INVENTION

The present invention relates to a gas fryer for cooking foodstuffs in cooking oil supplied and heated in an oil tank, more specifically, to a gas fryer comprising a heat pipe in an oil tank and a cooling system for cooling down effectively the exhaust gas from said heat pipe.

BACKGROUND OF THE INVENTION

Two different types of fryers, that is, a gas fryer and an electromagnetic fryer for cooking foodstuffs in cooking oil are known in the art. A typical gas fryer is a device of heating oil through heat pipes in the oil tank by the combustion gas of burning liquefied natural gas (LNG) or liquefied petroleum gas (LPG). On the other hand, an electromagnetic fryer is a device of heating oil by electromagnetic induction through the heat pipe generating heat by the electric current of a coil. In general, the recovering time (the time for recovering the temperature of oil, from a decreased temperature by adding foodstuffs into the oil tank, to a working temperature) of the gas fryer is shorter than that of the electromagnetic fryer. On the other hand, the temperature of the oil in the tank of the electromagnetic fryer is more uniform than that of the gas fryer (i.e. the low temperature heating which has little difference of the temperature of the oil and that of the heat pipe), thus, the degradation of the oil of the electromagnetic fryer is thought to be lesser than that of the gas fryer.

Figure 6:
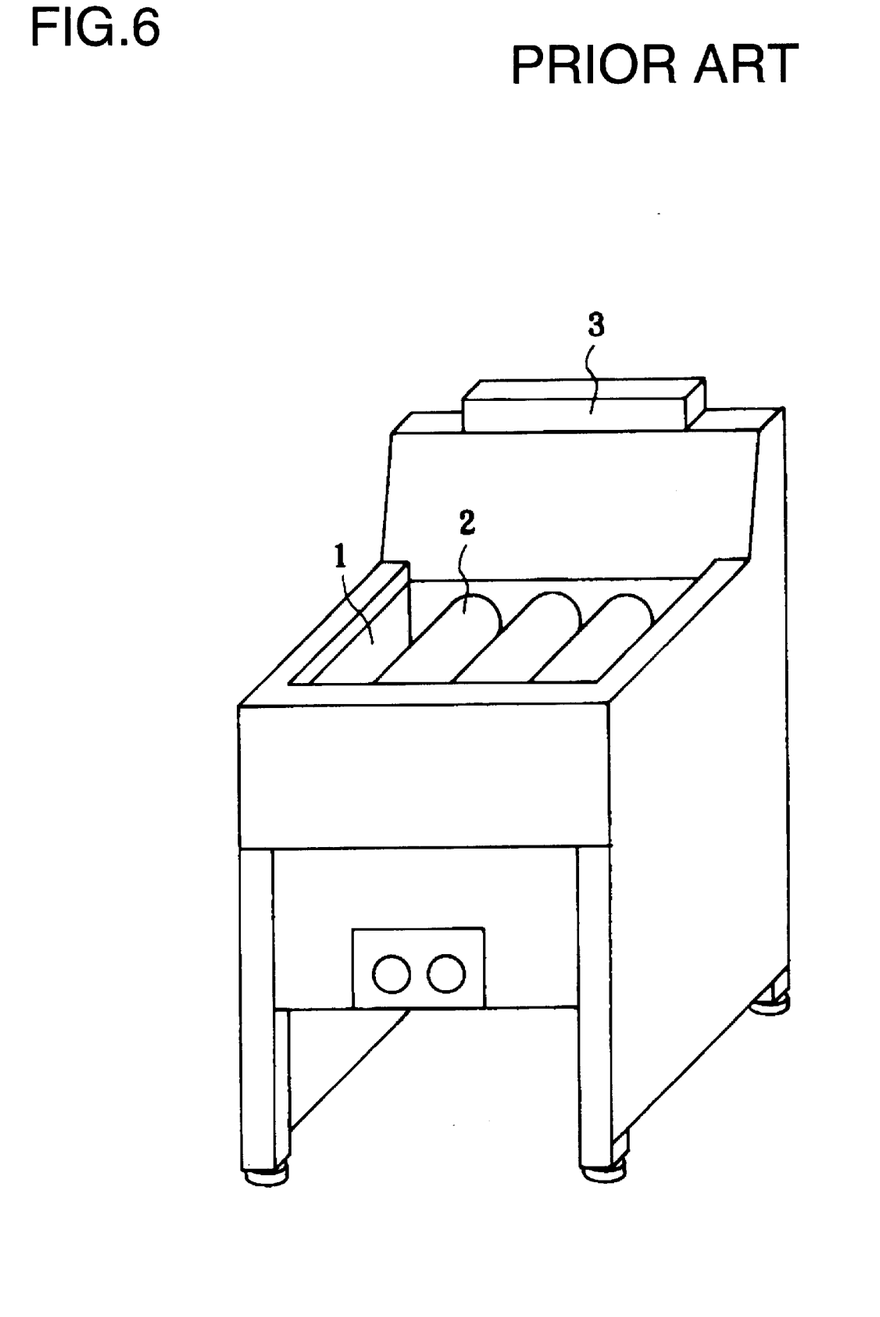
FIG. 6 shows a perspective view of a conventional gas fryer.
Figure 7:
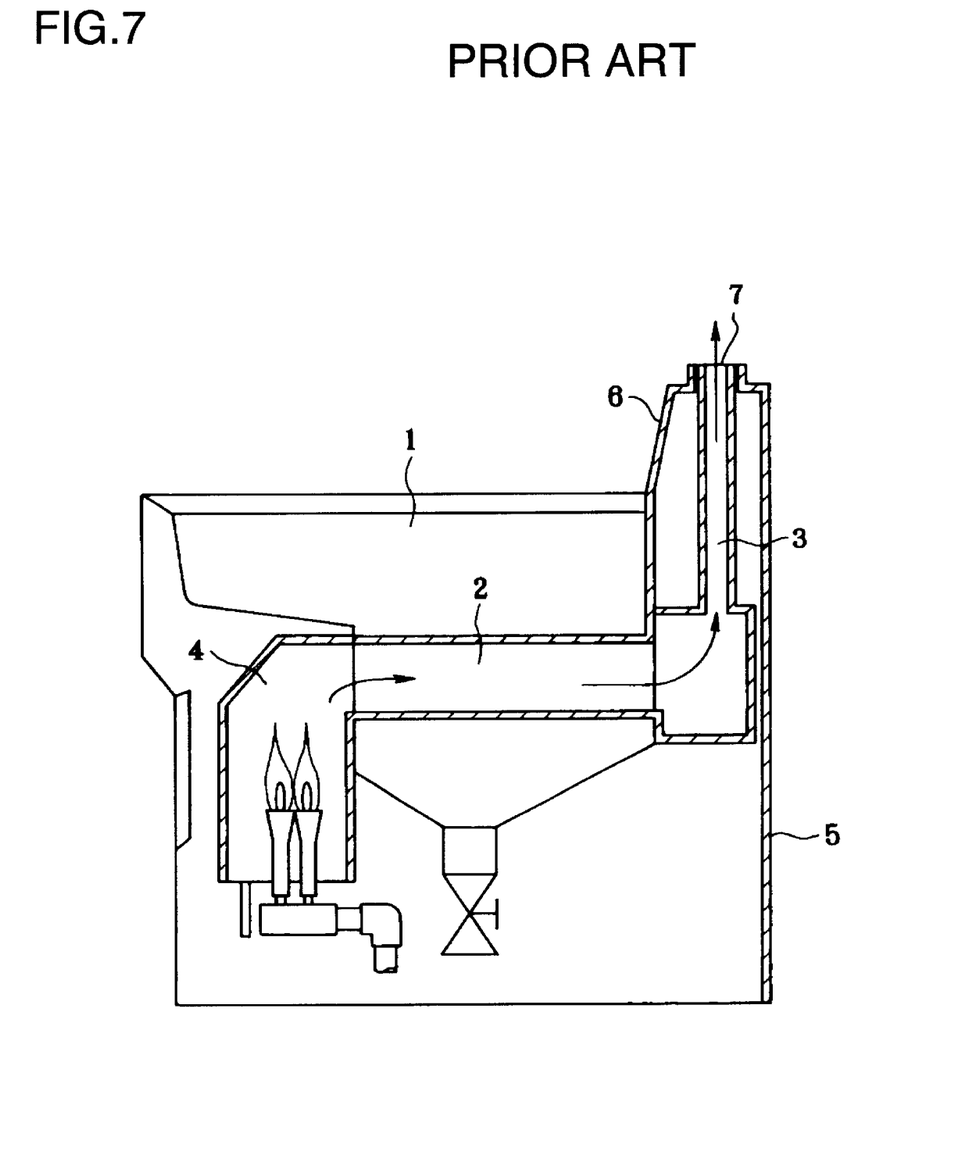
FIG. 7 shows a schematic cross section of the conventional gas fryer.

A gas fryer of such a conventional type comprises, as shown in FIGS. 6 and 7, heat pipes 2 located in an oil tank 1, a combustion chamber 4 from which the combustion gas is blowing from a burner and the like and which is located at the combustion gas inlet side of the heat pipe 2, and a flue 3 from which the combustion gas is exhausted and which is located at the combustion gas outlet side of the heat pipe 2. Almost all parts of said fryer are made of metal sheets such as a stainless steal, in order to improve the thermal conduction. The heat pipes 2 for conducting heat to the oil are located proximate in the middle along the direction of depth of the tank 1 and soaked in the cooking oil, thus, the oil is heated from the middle in the oil tank 1. The temperature of the lower part of the oil is kept as relatively low (approximately 50° C.), due to the gentle convection of the oil, therefore, the device is designed as to prevent the oxidation of oil and to be able to keep oil fresh in the long time.

The aforementioned gas fryer also discharges the exhaust gas, generally from the back of the device to outside as it is. Thus, the combustion gas exchanged the heat with the oil in the heat pipe 2, is discharged through the flue 3 as it is, as an exhaust gas holding the temperature of approximately 250 to 350° C. The temperature of the flue 3 elevates up to 150 to 250° C. by heating with the exhaust gas, the temperature of a backboard 5 also elevates to 100 to 200° C. due to the thermal conduction from the flue 3 to the backboard 5.

On the other hand, by heating the oil to 160 to 200° C. for cooking foodstuffs, the front panel and sideboard are also heated. A flue jacket 6 functions only as an accessory and for preventing splashes of oil, and an exhaust hole 7 is almost taken up by the flue 3. The air between the flue 3 and the flue jacket 6 is not ventilated.

However, the temperature gradient between the inlet and the outlet side of the heat pipe 2 is rather large in these conventional gas fryer, and a part of the heat pipe near the inlet side of the combustion gas is often over-heated (300 to 350° C. in comparison to the setting temperature at 180° C.). Thus, it is a problem that the unbalanced temperature causes the degradation of the oil. As the temperature of the oil decreases by adding foodstuffs, the cooking must be interrupted until the decreased temperature recovers to the setting point.

Further, it is also a problem that the working environment is deteriorated by extremely high atmospheric temperature near the fryer due to the extremely high temperature of the exhaust gas from the flue. In addition, the temperature of the flue and the backboard is also extremely high due to the high temperature of the exhaust gas, thus it is also a problem in safety to locate the fryer closely attached to the wall of the cooking facility.

SUMMARY OF THE DISCLOSURE

Therefore, it is an object of the present invention to prevent the degradation of cooking oil by improving uneven temperature of a gas fryer. It is a further object of the present invention to increase productivity by reducing the recovering time in a batch of cooking, and the waiting time of workers.

In addition, it is a still further object of the present invention to reduce the temperature of an exhaust gas from the gas fryer efficiently for lowering the temperature of a backboard of the fryer in the safe level.

In view of the above problems, present inventors have studied hard, and found out that the uneven temperature distribution of heat pipes was extremely reduced and the heat-exchange efficiency was extremely improved by preparing the heat pipe, the combustion chamber, the flue and/or a portion thereof with ceramic materials due to the thermal insulation, heat storage, and mixing of the combustion gas.

The present inventors have further found out that the temperature of the exhaust gas can be decreased effectively by providing an introduction system of cool fresh ambient air from outside of the flue. By decreasing the temperature of the exhaust gas effectively, the temperature of the flue can be decreased and the temperature of the backboard near the flue can also be decreased to such a sufficiently safe level that the fryer can be installed in closer to the wall of the cooking facility. These findings have led to the present inventions including the following concrete embodiments.

According to a first aspect of the present invention, there is provided a gas fryer comprising a tank for holding cooking oil, a heat pipe located proximate in the middle depth of said tank so that said heat pipe is soaked in said cooking oil, a combustion chamber located at a combustion gas inlet side of said heat pipe, and a flue located at a combustion gas outlet side of said heat pipe, wherein said heat pipe comprises an insulating sleeve fitted in the inner wall of said heat pipe to prevent direct contact of a combustion gas with the inner wall of said heat pipe, and an insulating spirally shaped mixer installed in said heat pipe, thereby providing approximately homogeneous temperature of said heat pipe.

In a preferred embodiment of the present invention, at least a portion of said sleeve and/or said spirally shaped mixer is made of a ceramic or fire-resistant material.

In a more preferred embodiment of the present invention, said spirally shaped mixer consists of one or more of spiral vanes.

In another preferred embodiment of the present invention, at least a portion of the flue is made of a thermal insulator.

A thermal insulator is provided between the combustion chamber and the wall of the tank located proximate to the combustion gas inlet side, and/or the combustion chamber is spatially separated from the tank, or at least a portion of the combustion chamber is made of a thermal insulator for suppressing heat loss. At least a portion of these thermal insulators can be prepared by ceramics.

In a still another preferred embodiment of the present invention, the gas fryer further comprising an entry guide for introducing the combustion gas into the heat pipe, and the entry guide constitute a part of the combustion chamber.

In another embodiment of the present invention, the heat pipe is directly connected to a burner, and whereby at least a portion of the heat pipe functions as the combustion chamber without separate provision of the combustion chamber.

According to a second aspect of the present invention, there is provided a gas fryer comprising a tank for holding cooking oil, a heat pipe located proximate in the middle depth of the tank so that the heat pipe is soaked in the cooking oil, a combustion chamber located at a combustion gas inlet side of the heat pipe, and a flue located at a combustion gas outlet side of the heat pipe, wherein the flue comprises an introduction system of fresh air, the system comprising an blowing nozzle of fresh air positioned proximate to the narrowed region located proximate in the middle of the flue along a longitudinal axis, an inlet of fresh air located on a part of the flue, and a passage of fresh air provided along the inner and/or outer wall of the flue, whereby the exhaust gas is cooled down and the exhaust gas is insulated from the environment around the flue.

In a preferred embodiment of the present invention, the passage of fresh air provided along the inner and/or outer wall of the flue is replaced or added by a passage of fresh air provided by one or more of walls for exchanging the heat between the fresh air and the exhaust gas on or around the top of the inlet of the combustion gas into the flue, and whereby the exhaust gas is cooled down effectively.

Further, in a preferred embodiment of the present invention, there is provided a gas fryer comprising: a tank for holding cooking oil, a heat pipe located proximate in the middle of the tank so that the heat pipe is soaked in the cooking oil, a combustion chamber located at a combustion gas inlet side of the heat pipe, and a flue located at a combustion gas outlet side of the heat pipe, wherein the heat pipe comprises a sleeve fitted in the inner wall of the heat pipe, and a spirally shaped mixer installed in the heat pipe, and wherein the flue comprises an introduction system of fresh air, the system comprising an blowing nozzle of fresh air positioned proximate to the narrowed region located proximate in the middle of the flue along a longitudinal axis, an inlet of fresh air located at a part of the flue, and a passage of fresh air provided along the inner and/or outer wall of the flue.

In another preferred embodiment of the present invention, there is provided a gas fryer comprising: a tank for holding cooking oil, a heat pipe located proximate in the middle depth of the tank so that the heat pipe is soaked in the cooking oil, a combustion chamber located at a combustion gas inlet side of the heat pipe, and a flue located at a combustion gas outlet side of the heat pipe, wherein the heat pipe comprises a sleeve fitted in the inner wall of the heat pipe, and a spirally shaped mixer installed in the heat pipe, and wherein the flue comprises an introduction system of fresh air, the system comprising a blowing nozzle of fresh air positioned proximate to the narrowed region located proximate in the middle of the flue along a longitudinal axis, an inlet of fresh air located on a part of the flue, and a passage of fresh air provided by one or more of walls for exchanging heat between the fresh air and the exhaust gas on or around the top of the inlet of the combustion gas into the flue, and/or provided along the inner and/or outer wall of the flue.

EXPLANATION OF THE REFERENCE NUMERALS 1, 10: oil tank
2, 20: heat pipe
3, 30: flue
4, 40: combustion chamber
5, 50: backboard
6, 33: flue jacket
7, 34: exhaust hole
21: mixer
22: sleeve
23: entry guide
24: thermal insulator
31: regulatory flue
32: air outlet of the flue jacket
35: blowing nozzle
36: passage of fresh air
37: parting board
38: inlet opening of fresh air
39: guide passage
60: slit between an exhaust hole and a flue jacket
61: lower side of the flue
62: upper side of the flue
63: lower side of the backboard
64: upper side of the backboard

PREFERRED EMBODIMENT OF THE INVENTION

Figure 1:
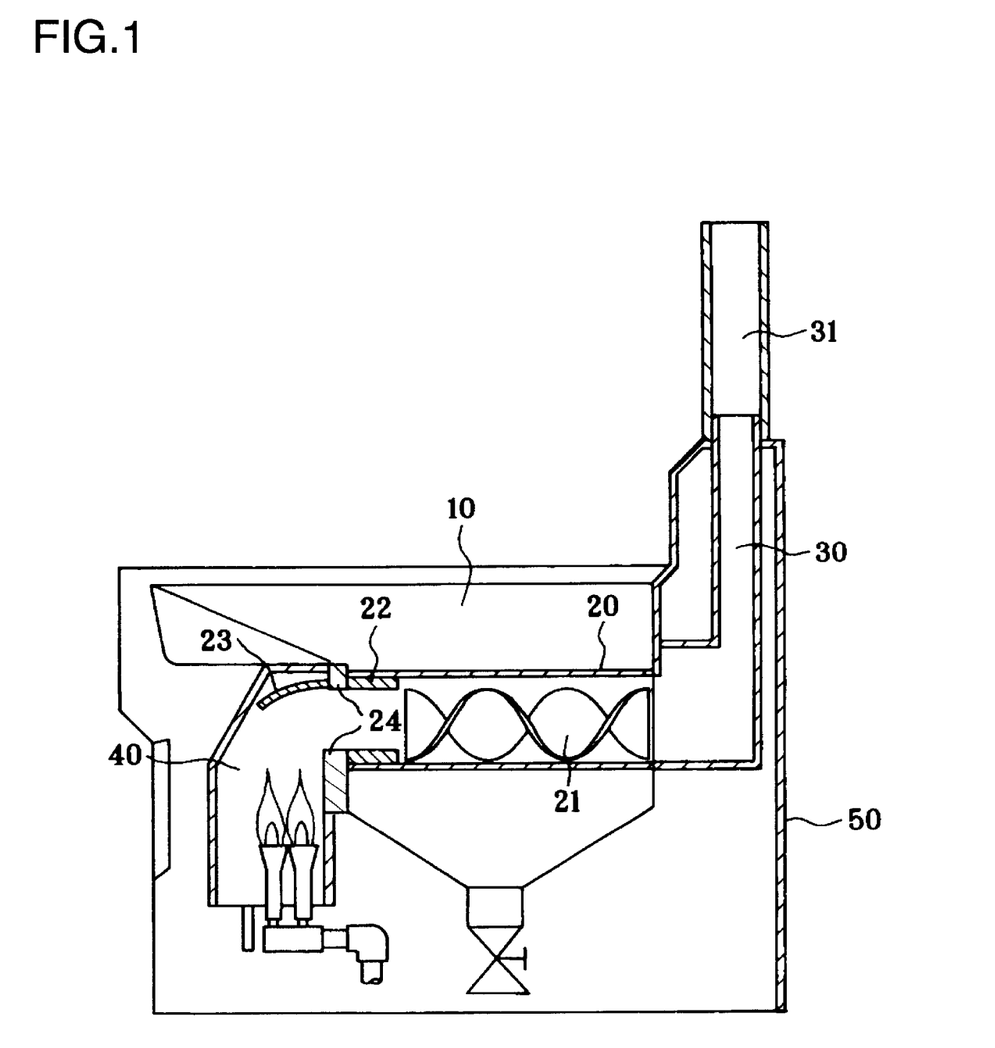
FIG. 1 shows a schematic cross section of one embodiment of a gas fryer of the present invention.

Embodiments of the present invention will be described referring to the relevant drawings. FIG. 1 is a section view illustrating schematically a gas fryer of an embodiment. The gas fryer comprises an oil tank 10, a heat pipe 20 located in the oil tank 10 in parallel, a combustion chamber 40 for blowing the combustion gas from the burners located at a combustion gas inlet side of the heat pipe 20, and a flue 30 for exhausting the combustion gas located at a combustion gas outlet side of the heat pipe 20, wherein the heat pipe 20 comprises an insulating and cylindrical sleeve 22 fitted in the inner wall of the heat pipe 20 for preventing the partial over-heat thereof by the direct contact of the combustion gas with the inner wall of the heat pipe 20, an insulating and spirally shaped mixer 21 installed in the heat pipe 20 for improving the heat-exchanger effectiveness by mixing the combustion gas flowing in the heat pipe 20 and elongating the residence time of the combustion gas, an inlet guide 23 to introduce the combustion gas into the heat pipe 20, a thermal insulator 24 provided between the wall of the oil tank 10 and the combustion chamber 40, and a regulatory flue 31 mounted on the flue 30 for optimizing the flow time of the combustion gas by adjusting its height.

It is preferable that said cylindrical sleeve 22 and said spirally shaped mixer 21 are made of ceramics or fire-resistant, insulating materials. In particular, ceramics are light in weight and easy to work the shape of the spiral vane and the like. Any kind of ceramics is available if it is fire-resistant, however, a porous and an insulating ceramic is used preferably. It is particularly preferable to use a thermal impact resistant ceramic which is resistant to sudden temperature changes. In addition, by selecting ceramics which have a low-thermal-conductivity or a small specific heat (which results in a small thermal inertia), it is advantageous to obtain a quick response to the heating and to control the temperature easily. Such ceramics are, for example, diatomaceous earth, cordierite ceramics, β-spodumene (or crystallized glass), alumina, mullite and silicon carbide.

The sleeve 22 is preferably fitted tightly in the inner wall of the heat pipe 20. If it is not tightly fitted, the combustion gas flows into the gap between the sleeve and the heat pipe and impair the effect of thermal insulation. The length of the sleeve 22 in the axial direction is adjusted between one tenth and one second of the total length of the heat pipe 20. It is preferably from one third to one sixth, and more preferably approximately one fifth. Further, an entry guide 23 to introduce the combustion gas into the heat pipe is provided at the inlet side of the combustion gas and constitutes a part of the combustion chamber. In addition, a thermal insulator 24 is provided between the combustion chamber and the oil tank to prevent over-heat of the heat pipe 20 at the combustion gas inlet side.

The spirally shaped mixer 21 is constituted with one or more than two of the spiral vanes. It can be produced as one seamless unit or by connecting two or more units which are produced separately. It is preferably twisted around the longitudinal central axis of the heat pipe 20, and the edge of the vane which is extended to the radial direction is approximately contacted to the inner wall of the heat pipe 20. The spiral vane is formed by twisting the vane right or left around the axis.

The spiral vane is also formed by twisting a vane which is extended bidirectionally or more than two way from the central axis. The thickness of the vane may be same from the central axis to the edge of the vane, or preferably, the thickness of the central region of the vane is large gradually decreasing to the direction of the edge of the vane.

The shape of the vane may be symmetric with respect to the plane exposed or not exposed to the combustion gas, or preferably, the plane exposed to the combustion gas is convex and the other plane is concave. The number of revolutions of the spiral is preferably one or more. It is more preferable to twist weakly in the inlet side and strongly in the outlet side of the combustion gas.

When every unit of the spiral vane is produced and connected with each other, the twist of each unit of the spiral may be same or weak in the inlet side and strong in the outlet side of the combustion gas. It is preferable to use such a material for the spiral vane that is easy to from, has a little heat capacity, lightweight and low cost. For this purpose, it is suitable that at least a portion of the spiral vane is made of ceramic.

The flue 30 and the combustion chamber 40 are preferably covered by a thermal insulator in part or in entirety. These insulator improve the heat exchange effectiveness by suppressing the heat loss, as well as they are effective to improve the working environment by preventing the increase of the temperature around the fryer. As a thermal insulator, there is used, for example, a fire-resistant ceramics, preferably a porous and insulating ceramics, and particularly preferably an impact resistant ceramic which is resistant to sudden temperature changes. Such ceramics are, for example, diatomaceous earth, cordierite ceramics, β-spodumene, alumina, mullite and silicon carbide.

And the heat pipe can be directly connected with a burner, and whereby at least a portion of the heat pipe 20 functions as the combustion chamber 40 without separate provision of the combustion chamber.

The function and the effect of the fryer of the present invention are, as is described in the undermentioned Examples clearly, the heat-exchanger effectiveness is improved by mixing the combustion gas, and the recovering time of the temperature of the oil is reduced significantly. By using the sleeve near the combustion gas inlet side simultaneously, and by adjusting the thickness and the length of the sleeve as appropriate, the temperature of the heat pipe becomes homogeneously and over-heat of the oil can be prevented. Further, the spirally shaped mixer installed in the heat pipe is effective not only for mixing of the combustion gas, but also for reserving the heat of the combustion gas to heat the oil.

Figure 2:
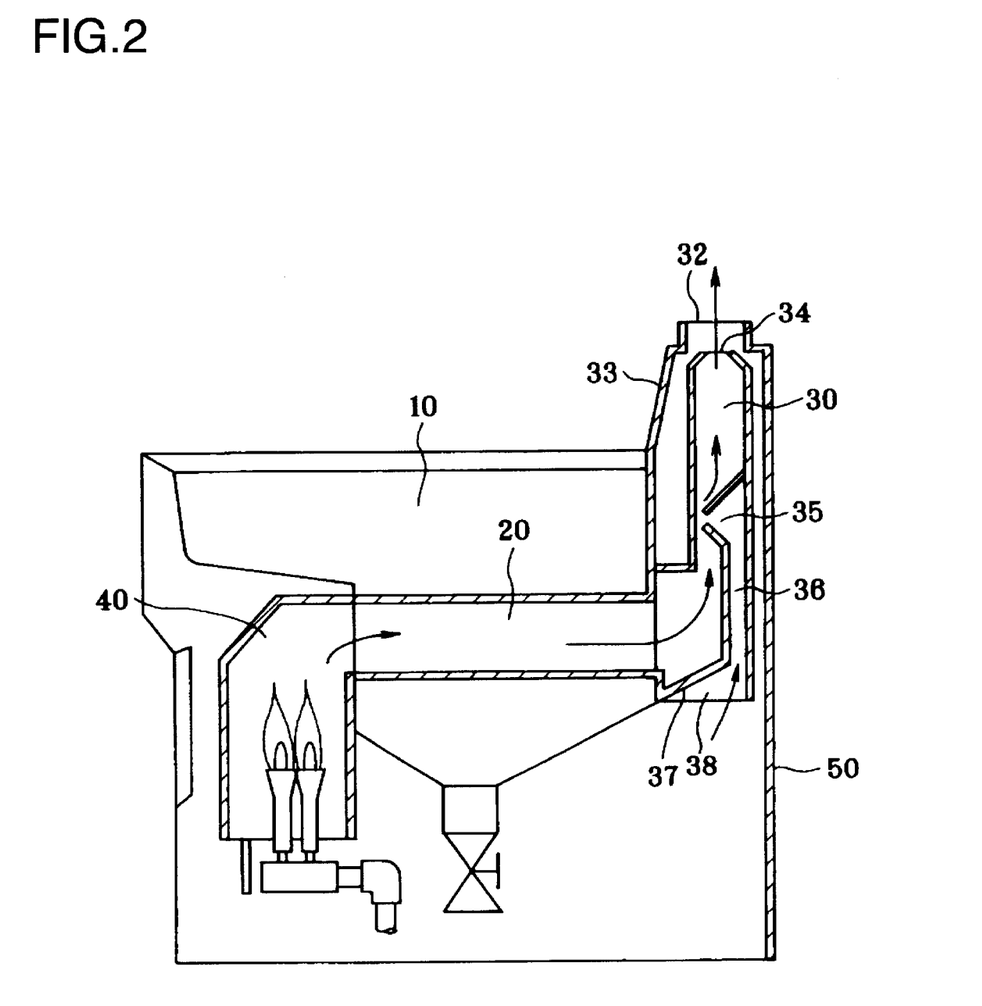
FIG. 2 shows a schematic cross section of another embodiment of a gas fryer of the present invention.

Further, other embodiments of the present invention will be described referring to the relevant drawings. FIG. 2 is a schematic cross section of another embodiment of the gas fryer of the present invention. The gas fryer shown in FIG. 2 comprises an oil tank 10, a heat pipe 20 located proximate to the middle depth of the oil tank 10 so as to be soaked in the cooking oil, a combustion chamber 40 for blowing the combustion gas from the burners located at a combustion gas inlet side of the heat pipe 20, and a flue 30 for exhausting the combustion gas located at a combustion gas outlet side of the heat pipe 20, wherein the flue further comprises a passage 36 of cool fresh air provided along the inner wall of the flue 30 near the backboard 50, by providing a parting board 37 inside the flue and opening the lower edge of the flue.

The parting board 37 works as a heat-exchange wall between the combustion gas and the fresh air, cools down the exhaust gas, and also elevates the temperature of the introduced fresh air, resulting in the increase of the fresh air by air bump. It decreases the passage area of the exhaust gas located proximate in the middle of the flue along a longitudinal axis, and increase the flow rate of the exhaust gas near the blowing nozzle 35 of the fresh air to capture the fresh air effectively. The passage 36 of the fresh air along the inner wall of the back of flue 30, prevent the thermal conduction of the exhaust gas to the backboard 50 by the insulating effect of the cool fresh air flowing through the passage. The insulating effect can reduce the temperature of the backboard 50 which is usually more than 100° C. to not more than 40° C.

The blowing nozzle 35 can be located in anywhere if the exhaust gas in the flue and the fresh air from the passage are mixed effectively, and the temperature of the exhaust gas is decreased. Typically, it is located proximate to the middle of the flue 30 to attain the above objects effectively. The passage area of the exhaust gas can be also optimized as appropriate in view of the length of the flue and the volume of the exhaust gas. The material of the flue 30 and the parting board 37 is typically a metal such as a stainless steel, however, any material which is heat-resistant to the exhaust gas is used. For example, a fire-resistant ceramics, preferably a porous and insulating ceramics, and particularly preferably an impact resistant ceramic which is resistant to sudden temperature changes can be used. Such ceramics are, for example, diatomaceous earth, cordierite ceramics, β-spodumene, alumina, mullite and silicon carbide.

The flue 30 is covered by flue jacket 33. The exhaust hole 34 of the flue 30 is lowered than the air outlet 32 of the flue jacket 33, and by decreasing the cross section of the exhaust hole 34, the flow rate of the exhaust gas near the air outlet 32 is increased. Thus, the air between the flue 30 and the flue jacket 33 moves, the fresh air flows into the space thereof from around the apparatus, and the temperature of the whole flue is decreased.

Figure 3:
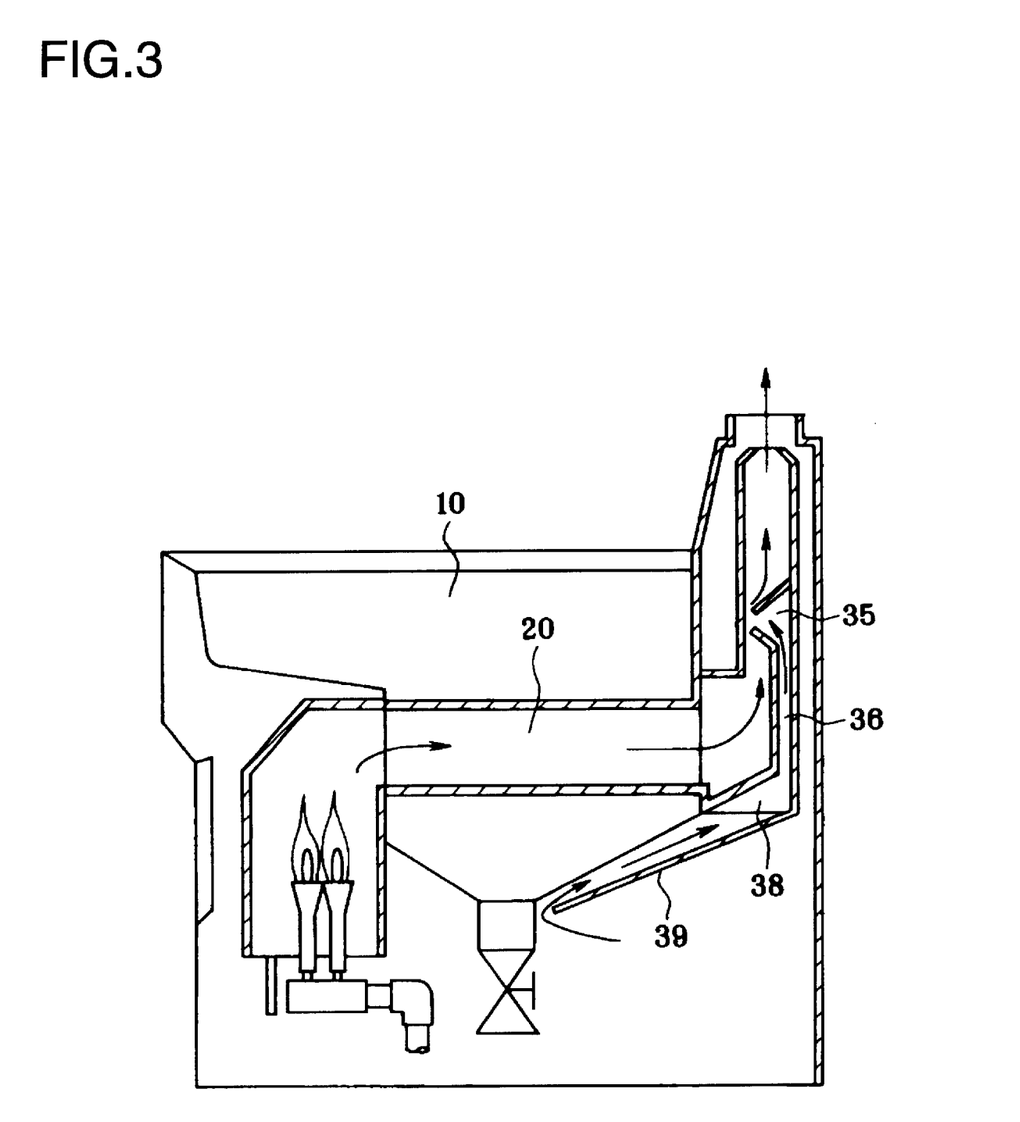
FIG. 3 shows a schematic cross section of still another embodiment of a gas fryer of the present invention.

The gas fryer shown in FIG. 3 is provided a guide passage 39 of fresh air at the inlet 38 of fresh air, and the air under the oil tank 10 is flown. The oil tank 10 is separated by the heat pipe 20 to both upper and lower part. The oil heated by the combustion gas is used for cooking foodstuff in the upper part of the oil tank 10, and the oxidized by-product drops to the bottom of the lower part of the oil tank 10 to drain from the outlet. The lower part of the oil tank is preferably maintained at a lower temperature to prevent the degradation of the oil due to the high temperature. The temperature of the oil in the lower part of the oil tank 10 can be decreased by the cool fresh air flowing in the guide passage 39.

Figures 4A, 4B, 4C, 4D, 4E:
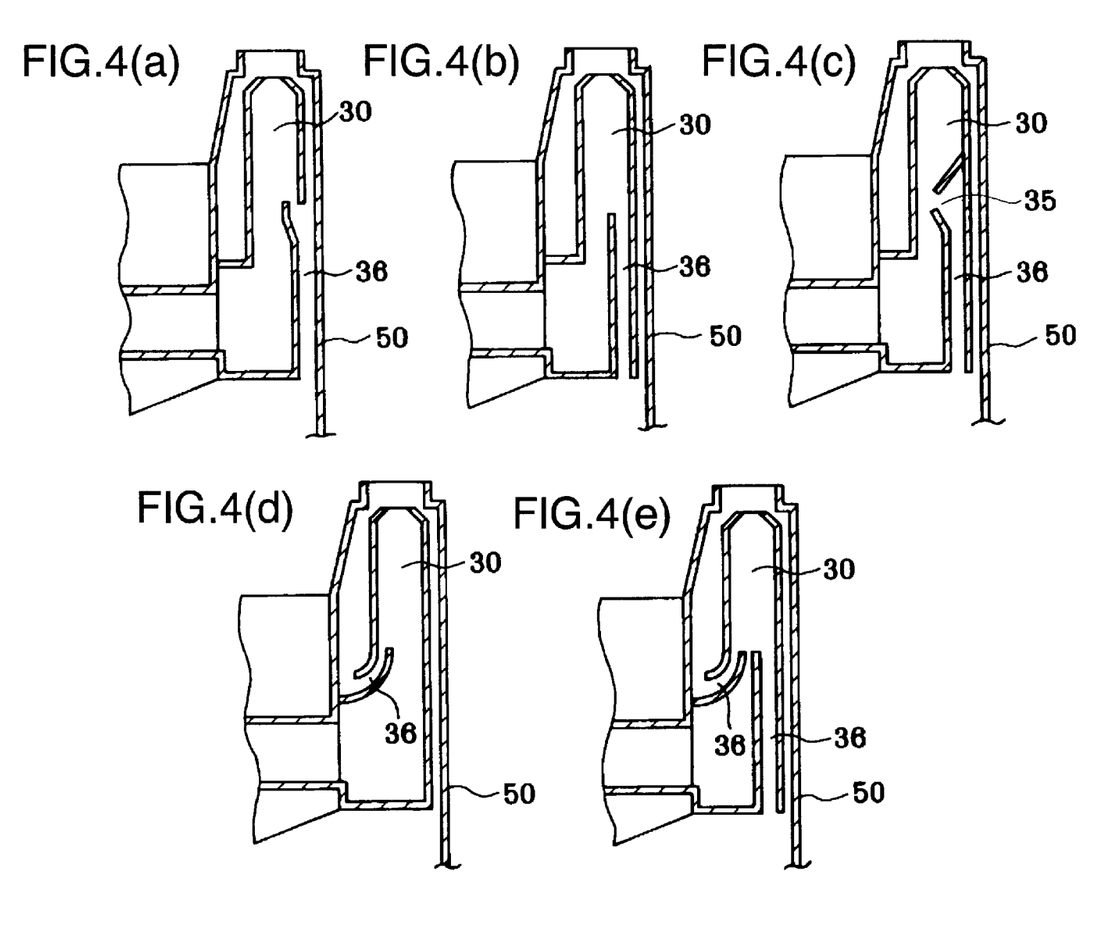
FIG. 4 shows schematic cross sections (a) to (e) of flues of other preferred embodiments of a gas fryer of the present invention.

Further, another embodiment of the present invention is explained referring to the relevant drawings. FIGS. 4 and 5 shows further preferred embodiments of the flue 30 of FIG. 2. FIG. 4(*a*) is an example which is provided a blowing nozzle in the approximately middle of the flue 30 along a longitudinal axis. It is designed to cool down the exhaust gas by aspirating the fresh air due to the up-flowing exhaust gas, and mixing the exhaust gas and the fresh air. FIG. 4(*b*) is an example which is provided with a passage 36 of fresh air along the wall of the flue 30 to exchange the heat of the exhaust gas with the fresh air. It is designed to cool down the exhaust gas prior to the mixing with the fresh air, to increase the flow rate of the up-flowing fresh air by the temperature rise of the fresh air, and to cool down the exhaust gas more effectively. In addition, it is designed as to insulate from the outside by the layer of the guide passage 36 between the passage of the exhaust gas and outer wall of the flue.

Figure 5A:
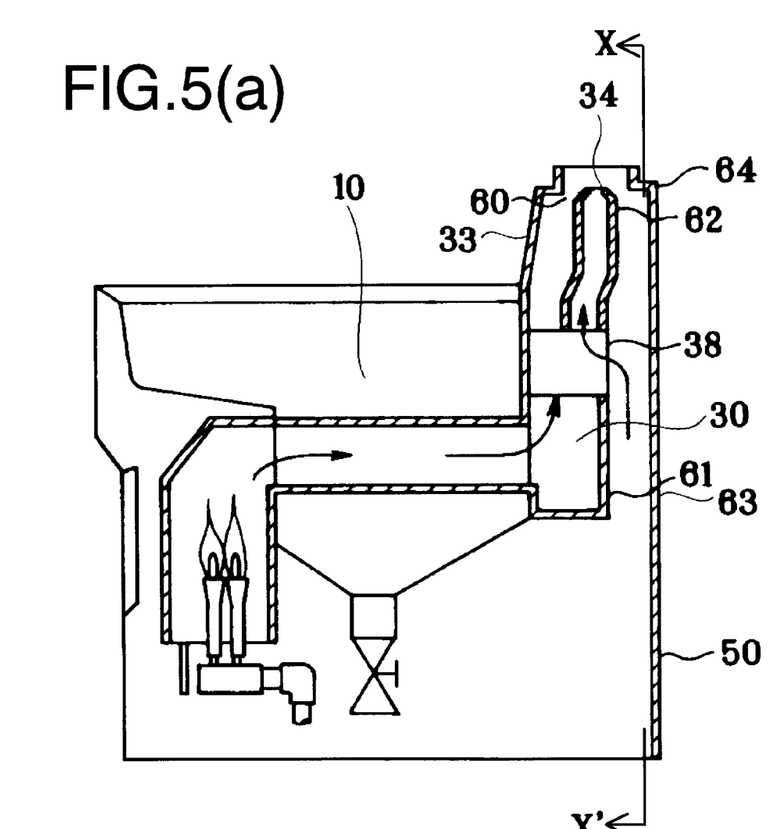
FIG. 5 shows a schematic cross section of a flue (a), and a right side view of (b) without an outer panel.
Figure 5B:
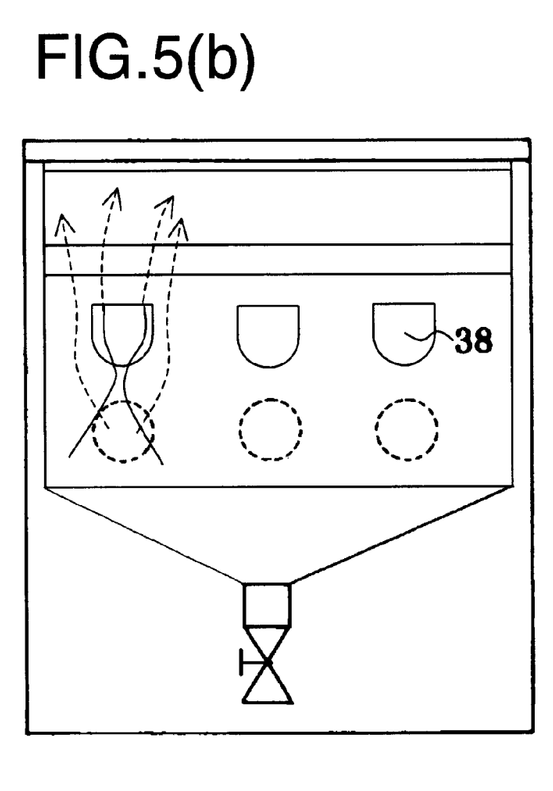

FIG. 4(*c*) is an example which is designed to increase the amount of introducing fresh air by reducing the cross section of the flue 30 near the blowing nozzle 35 and increasing the flow rate of the exhaust gas near the blowing nozzle 35 of the fresh air. FIG. 4(*d*) is an example which is provided with a blowing nozzle in the approximately middle of the flue along a longitudinal axis to exchange the heat of the exhaust gas with the fresh air on the entire undersurface of the passage of fresh air. It is designed to exchange heat with the exhaust gas of a higher temperature. FIG. 4(*e*) is an example which has a broader area of heat-exchanger. It is also designed to have a same effect of FIG. 4(*b*) to improve the efficiency. FIG. 5(*a*) is an example which has a blowing nozzle of fresh air located in the approximate middle of the flue along a longitudinal axis and a U-shaped inlet opening of fresh air in the back of the flue (refer to FIG. 5(*b*)). Three U-tubes 38 are disposed just on the inlet of the combustion gas (connecting position between the heat pipe and the flue) into the flue respectively, to reduce the cross section of the flue. Each of the U-tubes exchanges the heat of the exhaust gas one-to-one with the fresh air more effectively. The exhaust gas flows as to wrap the blowing nozzle of the fresh air to introduce and mix the fresh air more effectively. It is designed to compact the region near the inlet of the combustion gas, to isolate a region of high temperature of the exhaust gas in the bottom of the flue from the backboard, to mix without reducing the rate of the exhaust gas, and to insulate the heat of the exhaust gas from the backboard.

EXAMPLES

The present invention is explained in more detail by reference to the following examples. Example 1 is a result of the combustion test performed by using the device of FIG. 1.

Example 1

The oil tank 10 in FIG. 11 was a stainless tank with 390 mm in length, 325 mm in width and 265 mm in depth, in which three heat pipes with 89.1 mm in outside diameter, 1.2 mm in thick and 325 mm in length were provided in left, right and center of the oil tank respectively. The thermocouples were attached on the upper surfaces of both the combustion gas inlet and outlet sides of the heat pipes 20. 22 litter of soybean oil were poured in the oil tank 10, so that the heat pipes were soaked in the oil approximately 65 mm under the surface of the oil. Four or six burners were provided in the combustion chamber 40. Energy consumption was calculated by measuring the amount of gas flow. The temperature of the oil was measured by thermocouple at the position of about 15 mm above of the heat pipe in the approximate center of the oil tank. The temperature of the exhaust gas was measured by thermocouple at the combustion gas outlet of the flue.

In the approximate middle of these three heat pipes, ceramic mixer 21 with 260 mm in axial length made of diatomaceous earth (the product name: Isolite) were installed. The mixer 21 was produced by linking four spiral vanes of each 65 mm in length with metal bolts. Each unit of the spiral vane has two blades twisted approximately 90 degrees around the axis extending to the peripheral end. One of the mixers installed in the left heat pipe had a deep groove and a small share of the space. Another in the central heat pipe had a shallow groove and a large share of the space. The other in the right heat pipe had a deep groove and a small air resistance by cutting the combustion gas inlet side of the vane. The radius length of all vanes was 84 mm which is just smaller than the internal diameter of the heat pipe 20. A cylindrical sleeve 22 made of Isolite of 6 mm thick and 65 mm in length was inserted in approximate contact with the heat pipe 20 at the combustion gas inlet side. An insulator 24 made of Isolite was provide between the wall of the oil tank 10 near the inlet side of the combustion gas and the combustion chamber 40. Further, a regulatory flue 31 made of ceramic board of 450 mm height was prepared. The combustion chamber 40 equipped with the entry guide 23 was prepared by cutting the fire-resistant block so that the combustion gas was flew into the heat pipe easily as well as the thermal insulation was improved.

By using the aforementioned apparatus, the oil was heated at 180° C. by the burners according to each of the experimental conditions represented in table 1. The temperature of the exhaust gas, the recovering time (the required time for recovering the temperature of the oil from 170° C. to 180° C.), the maximum temperature of the heat pipes (the maximum values of the temperatures of the upper surface of the heat pipe) were measured.

TABLE 1

| | | Experimental conditions | | | | | Results | | |
|---|---|---|---|---|---|---|---|---|---|
| | | | | | | | | Temperature difference ($°$ C.) | |
| | | | Reg. | Eng. | T1 | T2 | Rec. | | |
| No. | Slv. | Mix. | arf. | (kcal/h) | ($°$ C.) | ($°$ C.) | time | Left | Center | Right |
| 1 | − | − | + | 10,950 | 340 | 240 | 3' 45" | 21.3 | 23.3 | 13.9 |
| 2 | + | + | + | 10,950 | 237 | 233 | 1' 51" | 19.0 | 2.9 | 4.5 |
| 3 | + | + | + | 14,200 | 258 | 254.7 | 1' 24" | 36.6 | 3.2 | 6.7 |
| 4 | + | + | + | 8,200 | 218 | 222.5 | 2' 58" | 9.7 | −3.6 | 2.2 |
| 5 | + | + | + | 9,430 | 221 | 232.3 | 2' 25" | 18.2 | −1.1 | 10.3 |
| 6 | + | + | − | 8,200 | 215 | 251.7 | 2' 40" | 42.9 | 14.4 | 8.8 |
| 7 | + | + | + | 8,200 | 141 | 243.8 | 2' 40" | 38.5 | 5.1 | 5.9 |
| 8 | + | − | + | 10,800 | 366 | 223 | 3' 56" | 7.2 | −11.5 | −7.1 |
| 9 | + | + | + | 10,800 | 240 | 246.3 | 1' 58" | 27.4 | −3.8 | −3.9 |
| 10 | − | + | + | 10,800 | 256 | 287.2 | 1' 41" | 83.3 | 57.4 | 22.3 |

Slv.: Sleeve
Mix.: Mixer
Reg. arf.: Regulatory flue
Eng.: energy of the combustion gas
T1: Temperature of the exhaust gas
T2: Maximum temperature of the heat pipes
Rec. time: Recovering time The maximum temperature of the heat pipe of Experiment No. 1 was 240° C., whereas the temperature of the heat pipe near the inlet side of the combustion gas of conventional fryer is 300 to 350° C. Such a difference was thought to be the effect of the insulator between the wall of the oil tank near the inlet side of the combustion gas and the combustion chamber. The comparison of the results of Experiment 1 and 2 showed that the recovering time was extremely reduced by installing the sleeve and the mixer. The temperature difference between the inlet and the outlet of the heat pipe was also reduced. The results of various amounts of energy consumption due to various numbers and intensities of the gas burner were shown in Experiment Nos. 2 to 5. According to these results, it was understood that the increase of energy consumption made the recovering time short.

The effects of the length of the flue were shown in the results of Experiment Nos. 6 and 7 which indicate that the temperature difference between the inlet and the outlet of the heat pipe was reduced, although the recovering time was almost same. Further, the effect of the mixer which was compared between Experiment No. 8 and 9 was indicated that the presence or absence of the mixer had the great influence on the reduction of the recovering time.

The effect of the sleeve which was compared between Experiment No. 9 and 10 was indicated that the temperature difference between the inlet and the outlet of the heat pipe was reduced as well as the maximum temperature of the heat pipe was reduced up to 40° C., without elongating the recovering time. These results suggest that the temperature difference between the inlet and the outlet of the heat pipe can be reduced significantly by preparing the sleeve in accordance with the characteristics of the mixer, without elongating the recovering time.

Example 2

When the temperatures of three heat pipes having the same spiral vane in shape were measured, it was observed that the temperature of the middle heat pipe was higher than that of left and right heat pipes. In addition, the flame of fire from the gas burner tended to converge at the middle. Thus, the thickness of the sleeve, that is, the cross section of the combustion gas inlet side of the heat pipe was changed, and the combustion tests were performed. The conditions of the tests were according to those of Example 1, except that the energy of the combustion gas is 9,430 kcal/h, the length of the spiral vane is approximately 130 mm (two spiral vane of 65 mm in length, having a bidirectionally extended vane from central axis twisted approximately 180 degree in right hand were connected with metal bolts), and the spiral vanes were disposed as the rear edge of the vane fits the outlet edge of the heat pipe. The results are shown in Table 2.

TABLE 2

| | Thickness of the sleeve (mm) | | Temperature of heat pipes ($°$C.) | | | | | |
|---|---|---|---|---|---|---|---|---|
| | left | | left | | center | | right | |
| Exp. | and | | | | | | | |
| No. | center | right | inlet | outlet | inlet | outlet | inlet | outlet |
| 11 | 6 | 6 | 231 | 225 | 242 | 236 | 230 | 231 |
| 12 | 12 | 6 | 232 | 226 | 225 | 237 | 231 | 232 |
| 13 | 9 | 6 | 232 | 226 | 233 | 238 | 232 | 232 |

According to the results of Experimental Nos. 11 to 13 in table 2, it is understood that the temperature of the heat pipes is adjustable freely, and there is hardly any temperature difference among the heat pipes, by adjusting the thickness of the sleeve to adjust the cross section of the inlet side of the heat pipe.

Example 3

Another embodiment of the present invention is explained by referring to FIGS. 5 to 7. The apparatus used for the experiment was produced by combining the flue of FIG. 5 with the conventional gas fryer in FIGS. 6 and 7.

The fryer comprised the oil tank 10 holding 22 liter cooking oil, gas burners of 10,000 kcal/hour, and three heat pipes of 86.1 mm internal diameter×325 mm effective length. The area of the inlet opening of fresh air 38 was 3,532 mm²×3, the area of the blowing nozzle was 1,540 mm²×3, and the area of heat exchangers was 13,658 mm²×3. The space between the flue 30 and the backboard 50 was made 20 mm larger than that of the conventional fryer to insulate from the exhaust gas of high temperature. The slit 60 between the exhaust hole 34 and the flue jacket 33 was 5 mm, although there is no slit in the conventional fryer. The temperatures at the lower side 61, and the upper side 62 of the flue 30, and the lower side 63, and the upper side 64 of the backboard 50 were measured by thermal sensors.

For the experiment which simulates the conventional gas fryer, the inlet openings 38 of fresh air were closed by stainless plates, and the slit 60 between the exhaust hole 34 and the flue jacket 33 was sealed by stainless tapes. The results are shown as "complete close" in Exp. No. 14 of table 3.

Next, as an embodiment of the present invention, the results when the inlet openings of fresh air 38 were opened and the slit 60 between the exhaust hole 34 and the flue jacket 33 was sealed by stainless tapes are shown as "open" in Exp. No. 15 of table 3. Finally, both of the inlet openings of fresh air 38 and the slit 60 were opened and the results were shown as "complete open" in Exp. No. 16 of table 3. The temperature of fresh air outside the fryer was 20° C., and the setting temperature of the cooking oil was 180° C., and the measured temperature of the cooking oil was 178 to 183° C. The temperatures were measured at the steady state after 1 hour heating.

TABLE 3

| Exp. No. | 14 | 15 | 16 |
|---|---|---|---|
| Conditions | Complete close | Open | Complete open |
| The lower side 61 of the flue | 214° C. | 193° C. | 196° C. |
| the upper side 62 of the flue | 169° C. | 122° C. | 110° C. |
| the lower side 63 of the backboard | 46° C. | 34° C. | 31° C. |
| the upper side 64 of the backboard | 102° C. | 73° C. | 54° C. |
| The exhaust hole 34 | 264° C. | 178° C. | 162° C. |

The temperature of the exhaust gas at the exhaust hole 34 in Experiment 14 which simulates the conventional gas fryer, was 264° C. On the other hand, the temperature in Experiment 15 which was provided a passage of fresh air, was 178° C. confirming the sufficient effect of cooling down the exhaust gas by the introduction of fresh air. And the temperature of the upper side of the backboard was higher than that of lower side, and the temperature of the upper side of the backboard could be decreased from 102° C. (the conventional fryer) to 73° C. (with the passage of fresh air). Further, by flowing the air between the exhaust hole 34 and the flue jacket 33, it could be cooled down to 54° C.(half of that of conventional fryer). This effect enabled to install the fryer in closer to the wall of the cooking facility. Finally, it was confirmed that the temperature of the exhaust gas and that of the backboard could be decreased significantly by providing a passage of fresh air, and those temperatures could be further decreased by flowing the air between the exhaust hole 34 and the flue jacket 33.

With respect to the temperature decrease from 264° C. (Experiment 14) to 178° C. (Experiment 15) as described above, the ratio of the introduced amount of fresh air to the flow of the exhaust gas by weight is calculated as the following equation, assuming that the specific heat of exhaust gas and fresh air is same and the temperature of fresh air is 20° C.

$$(264-178)/(178-20)=0.544$$

This calculation indicates that the amount of the introduced fresh air is more than half of that of the exhaust gas. If the pressure of exhaust gas and fresh air is same, the ratio of the introduced amount of fresh air to the flow of the exhaust gas by volume is calculated as the following equation:

$$0.544 \times (20+273)/(264+273)=0.297$$

This calculation indicates that the amount of the introduced fresh air is about 30% of that of the exhaust gas by volume. If a guide passage is provided near the inlet opening of fresh air as flowing the air around the part in which the cooling is necessary, the air can be ventilated up to 30% of the flow (volume) of the exhaust gas to cool down. The amount of the ventilation can be controlled by the structure of the passage of fresh air and the size of the inlet opening of fresh air.

According to the improved gas fryer of the present invention, nonuniform temperature of the exhaust gas in the heat pipe, and the over-heat of a portion of the heat pipe can be suppressed. This effect prevents the degradation of the oil and the shelf life of the oil can be elongated. In addition, by reducing the recovering time after addition of the food stuff, the productivity and the quality can be increased. Further, the exhaust temperature of the combustion gas and the heat radiation to the working environment can be reduced to improve the heat-exchanger effectiveness.

Further, according to the function of the passage of fresh air provided in the flue, the temperature of the exhaust gas can be reduced by mixing the cool fresh air introduced from the bottom of the flue with the exhaust gas in the flue using the principle of exchanging heat of fresh air and exhaust gas, and generation of gas flow from the low temperature portion to the high temperature portion. This enables to cool down the temperature near the apparatus and improve the working environment significantly.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A gas fryer comprising:

a tank for holding cooking oil, a heat pipe located proximate in the middle depth of the tank so that the heat pipe is soaked in the cooking oil, a combustion chamber producing combustion gas and located at a combustion gas inlet side of the heat pipe, and a flue located at a combustion gas outlet side of the heat pipe, and an insulating sleeve covering the inner wall of the end of the heat pipe at the inlet side, the insulating sleeve preventing direct contact of the combustion gas with the inner wall of the heat pipe at the inlet side, and an insulating spirally shaped mixer installed in said heat pipe, thereby providing an approximately homogeneous temperature of the heat pipe.

2. The gas fryer of claim 1, wherein at least a portion of said sleeve and/or said spirally shaped mixer is made of a ceramic or a fire-resistant material.

3. The gas fryer of claim 1, wherein said spirally shaped mixer consists of one or more spiral vanes.

4. The gas fryer of claim 1, further comprising an entry guide for introducing the combustion gas into said heat pipe.

5. The gas fryer of claim 4, wherein said entry guide constitutes a part of said combustion chamber, whereby the combustion chamber comprises said entry guide.

6. The gas fryer of claim 1, wherein at least a portion of said flue is made of a thermal insulator.

7. The gas fryer of claim 1, wherein at least a portion of said combustion chamber is made of a thermal insulator for suppressing heat loss.

8. The gas fryer of claim 1, wherein a thermal insulator is provided between said combustion chamber and the wall of said tank located proximate to the combustion gas inlet side, and/or wherein said combustion chamber is spatially separated from said tank.

9. The gas fryer of claim 6, wherein at least a portion of said thermal insulator is made of ceramics.

10. The gas fryer of claim 7, wherein at least a portion of said thermal insulator is made of ceramics.

11. The gas flyer of claim 8, wherein at least a portion of said thermal insulator is made of ceramics.

12. The gas fryer of claim 1, wherein said heat pipe is directly connected to a burner, and whereby at least a portion of said heat pipe functions as said combustion chamber without separate provision of said combustion chamber.

13. The gas fryer of claim 1, wherein said flue comprises an introduction system of fresh air, said introduction system comprising of a blowing nozzle of the fresh air positioned proximate to a narrowed region located proximate in the middle of said flue along a longitudinal axis, an inlet of fresh air located at a part of said flue, and a passage of fresh air provided along the inner and/or outer wall of said flue.

14. The gas fryer of claim 13, wherein the passage of fresh air is provided by one or more of walls for exchanging heat between the fresh air and the exhaust gas on or around the top of the inlet of the combustion gas into to flue, and/or provided along the inner and/or outer wall of said flue.

* * * * *